US012771006B2

(12) United States Patent
Kumagai

(10) Patent No.: US 12,771,006 B2
(45) Date of Patent: Oct. 20, 2026

(54) COUPLED WAVEGUIDE AND WAVEGUIDE COUPLING METHOD

(71) Applicant: MEKTEC CORPORATION, Tokyo (JP)

(72) Inventor: Kenji Kumagai, Tokyo (JP)

(73) Assignee: MEKTEC CORPORATION, Minato-ku (JP)

( * ) Notice: Subject to any disclaimer, the term of this patent is extended or adjusted under 35 U.S.C. 154(b) by 51 days.

(21) Appl. No.: 19/081,906

(22) Filed: Mar. 17, 2025

(65) Prior Publication Data

US 2025/0293419 A1 Sep. 18, 2025

Related U.S. Application Data

(63) Continuation of application No. PCT/JP2024/039156, filed on Nov. 1, 2024.

(30) Foreign Application Priority Data

Mar. 18, 2024 (JP) ................................ 2024-042859

(51) Int. Cl.
*H01Q 13/02* (2006.01)
*H01P 1/04* (2006.01)
(Continued)

(52) U.S. Cl.
CPC ............... *H01P 3/12* (2013.01); *H01Q 13/02* (2013.01)

(58) Field of Classification Search
CPC ...... H01P 1/04; H01P 3/12; H01P 5/02; H01P 5/08; H01P 5/10; H01P 5/107; H01P 3/18;
(Continued)

(56) References Cited

U.S. PATENT DOCUMENTS 5,539,361 A * 7/1996 Davidovitz ............. H01P 5/085 333/34
7,064,633 B2 * 6/2006 Wu ......................... H01P 5/082 333/230

(Continued)

FOREIGN PATENT DOCUMENTS

JP 6349437 B1 6/2018
WO WO 2021/193805 A1 9/2021

OTHER PUBLICATIONS

Taiwanese Office action of the corresponding TW Application No. 114100826 mailed on Feb. 9, 2026.

*Primary Examiner* — Tho G Phan
(74) *Attorney, Agent, or Firm* — WTA IP Law P.C.

(57) ABSTRACT

To provide a coupled waveguide that can be easily manufactured and avoid degradation of transmission characteristics. A coupled waveguide of an embodiment includes a waveguide configured to propagate electric waves and provided with a first opening window that radiates the electric waves to outside, a waveguide provided with a second opening window that absorbs electric waves from outside, configured to propagate the electric waves absorbed through the second opening window, and coupled to the waveguide such that the second opening window at least partially overlaps the first opening window, and an anisotropic conductive film covering the first opening window and the second opening window and bonding the waveguide and the waveguide.

11 Claims, 13 Drawing Sheets

(51) Int. Cl.
*H01P 3/12* (2006.01)
*H01P 5/10* (2006.01)

(58) Field of Classification Search
CPC H01Q 1/22; H01Q 13/02; H05K 1/02; H05K 1/11
See application file for complete search history.

(56) References Cited

U.S. PATENT DOCUMENTS

| | | | | |
|---|---|---|---|---|
| 8,922,425 | B2 * | 12/2014 | Hayata | H01P 3/12 343/762 |
| 9,531,052 | B2 * | 12/2016 | Dang | H01P 3/08 |
| 11,894,595 | B2 * | 2/2024 | Lim | H01P 3/082 |
| 12,283,736 | B2 * | 4/2025 | Alexanian | H01P 3/121 |
| 12,355,149 | B1 * | 7/2025 | Willis | H01P 1/171 |
| 2021/0111472 | A1 | 4/2021 | Myers et al. | |
| 2023/0268632 | A1 | 8/2023 | Snygg et al. | |

* cited by examiner

SAMPLE A

SAMPLE B

COUPLED WAVEGUIDE AND WAVEGUIDE COUPLING METHOD

CROSS-REFERENCE TO RELATED APPLICATIONS

This is a bypass continuation of International PCT Application No. PCT/JP2024/039156 filed on Nov. 1, 2024, which claim priority to Japanese Patent Application No. 2024-042859, filed on Mar. 18, 2024, which are incorporated by reference herein in their entirety.

TECHNICAL FIELD

The present invention relates to a coupled waveguide and a waveguide coupling method, and more specifically, relates to a coupled waveguide in which waveguides are coupled to each other and a method of coupling waveguides to each other.

BACKGROUND ART

Technologies for coupling waveguides to each other have been conventionally known. For example, Patent Literature 1 describes that two waveguides are coupled through an opening window of a conductor layer by using a conductive joint in a rectangular frame shape.

In the above-described method, it is needed to highly accurately position opening windows of the waveguides and the frame-shaped conductive joint. The widths of the opening windows can be increased to provide a margin for the positioning. However, impedance mismatch may occur, potentially degrading the transmission characteristics.

SUMMARY OF INVENTION

The problem to be solved by the present invention is to provide a coupled waveguide that can be easily manufactured and avoid degradation of transmission characteristics.

A coupled waveguide according to the present invention includes:

- a first waveguide configured to propagate electric waves and provided with a first opening window that radiates the electric waves to outside;
- a second waveguide provided with a second opening window that absorbs electric waves from outside, configured to propagate the electric waves absorbed through the second opening window, and coupled to the first waveguide such that the second opening window at least partially overlaps the first opening window; and
- an anisotropic conductive film covering the first opening window and the second opening window and bonding the first waveguide and the second waveguide.

In the coupled waveguide, conductive particles of the anisotropic conductive film may be included in an overlapping part of the first opening window and the second opening window when a coupling part of the first waveguide and the second waveguide is viewed in a thickness direction.

In the coupled waveguide, the first waveguide may include:

- a first dielectric layer having a first principal surface and a second principal surface,
- a first conductive layer provided on the first principal surface,
- a second conductive layer provided on the second principal surface and including the first opening window,

- a first post column in which a plurality of conductive posts penetrating through the first dielectric layer and electrically connecting the first conductive layer and the second conductive layer are arranged in a traveling direction of the electric waves, and
- a second post column in which a plurality of conductive posts penetrating through the first dielectric layer and electrically connecting the first conductive layer and the second conductive layer are arranged parallel to the first post column.

In the coupled waveguide, the second waveguide may include:

- a second dielectric layer having a third principal surface and a fourth principal surface,
- a third conductive layer provided on the third principal surface and including the second opening window,
- a fourth conductive layer provided on the fourth principal surface,
- a third post column in which a plurality of conductive posts penetrating through the second dielectric layer and electrically connecting the third conductive layer and the fourth conductive layer are arranged in a traveling direction of the electric waves, and
- a fourth post column in which a plurality of conductive posts penetrating through the second dielectric layer and electrically connecting the third conductive layer and the fourth conductive layer are arranged parallel to the third post column.

In the coupled waveguide, the first opening window and the second opening window may have slit shapes extending in a direction orthogonal to the traveling direction of the electric waves, and the first opening window and the second opening window may have equal opening widths.

In the coupled waveguide, the first opening window and the second opening window may have slit shapes extending in a direction orthogonal to the traveling direction of the electric waves, and the first opening window and the second opening window may have different opening widths.

In the coupled waveguide, the second waveguide may be a waveguide pipe including the second opening window.

The coupled waveguide may include a horn antenna connected to an end part of the waveguide pipe.

In the coupled waveguide, the first opening window and the second opening window may have slit shapes extending in a direction orthogonal to a traveling direction of the electric waves, and a size of conductive particles contained in the anisotropic conductive film may be smaller than widths of the first and second opening windows in the slit shapes.

A waveguide coupling method of the present invention includes:

- a step of preparing a first waveguide configured to propagate electric waves and provided with a first opening window that radiates the electric waves to outside;
- a step of preparing a second waveguide provided with a second opening window that absorbs electric waves from outside and configured to propagate the electric waves absorbed through the second opening window; and
- a step of covering the first opening window and the second opening window with an anisotropic conductive film and coupling the first waveguide and the second waveguide such that the first opening window and the second opening window at least partially overlap each other.

The waveguide coupling method may include increasing density of conductive particles contained in the anisotropic conductive film to reduce reflection at a coupling part of the first waveguide and the second waveguide.

According to the present invention, it is possible to provide a coupled waveguide that can be easily manufactured and avoid degradation of transmission characteristics.

DETAILED DESCRIPTION OF EMBODIMENT

Figure 1:
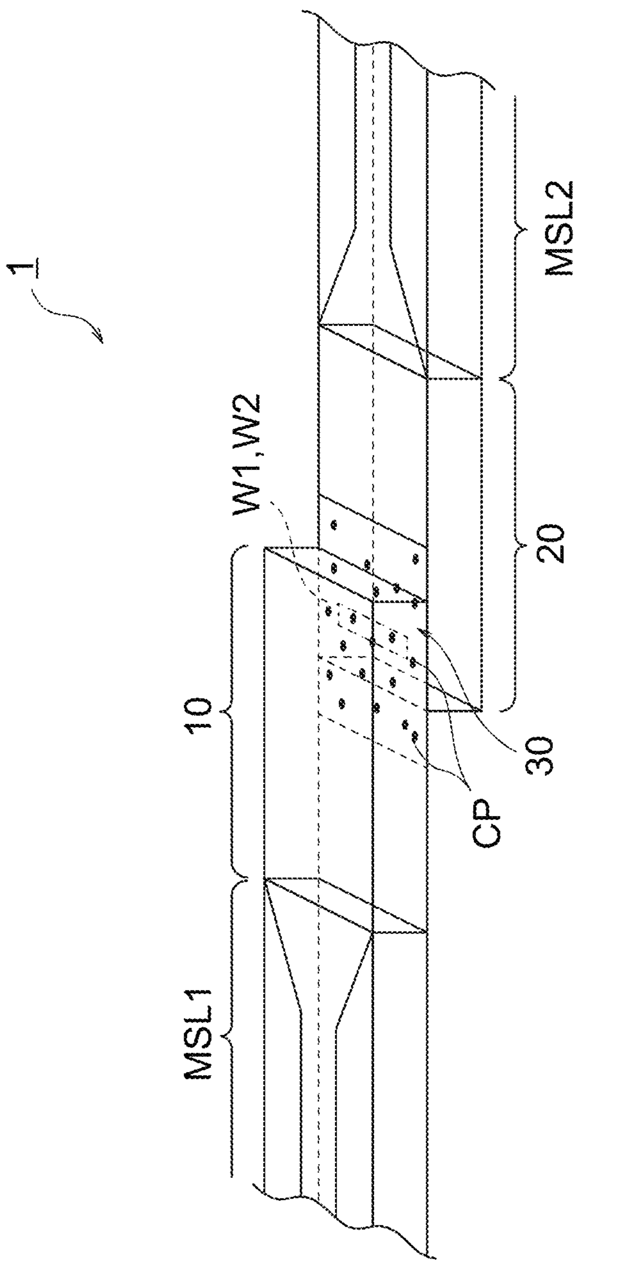
FIG. 1 is a perspective view of a coupled waveguide according to an embodiment.

An embodiment according to the present invention will be described below with reference to the accompanying drawings. Note that, in the drawings, constituent components having equivalent functions are denoted by the same reference sign. The drawings are schematically illustrated, and the relation between thickness and planar dimensions, the ratio of layer thicknesses, and the like are different from those in reality in some cases.

Moreover, shapes, geometric conditions, physical characteristics, and terms such as “parallel”, “orthogonal”, “equal”, and “same” and values of dimensions and physical characteristics for specifying their degrees, which are used in the present specification are not limited to their rigorous meanings but should be interpreted within a range in which similar functions can be expected.

<Coupled Waveguide>

A coupled waveguide 1 according to an embodiment will be described below with reference to FIGS. 1 to 5.

Figure 2:
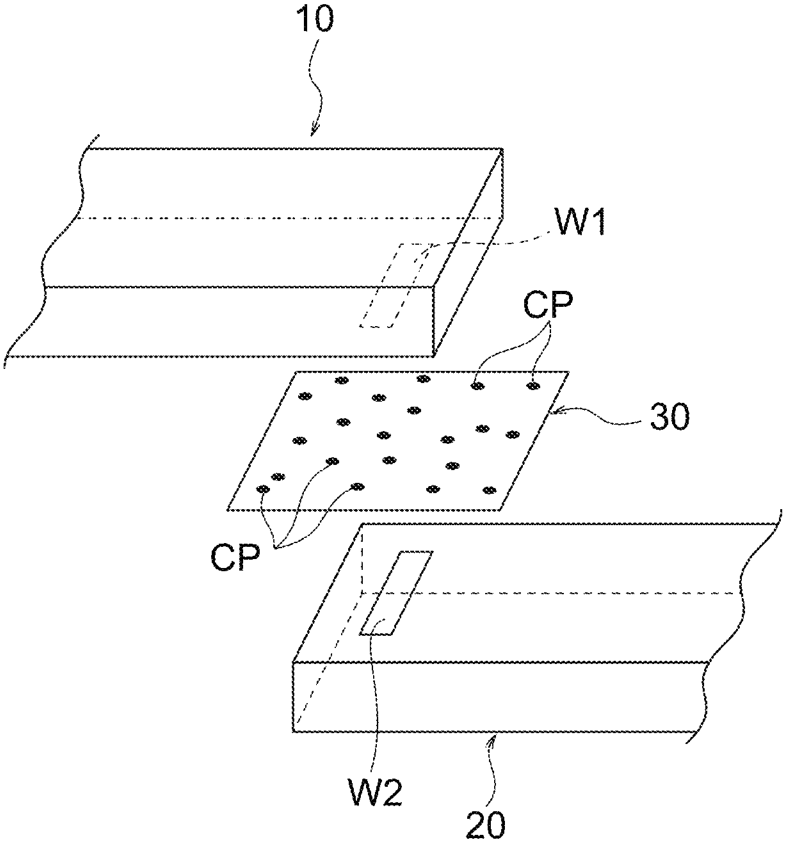
FIG. 2 is an exploded perspective view of the coupled waveguide according to the embodiment.

As illustrated in FIGS. 1 and 2, the coupled waveguide 1 includes a waveguide 10 (first waveguide), a waveguide 20 (second waveguide) coupled to the waveguide 10, and an anisotropic conductive film 30 bonding the waveguide 10 and the waveguide 20.

The waveguide 10 is configured to propagate electric waves. As described later, the waveguide 10 in the present embodiment is a substrate integrated waveguide (SIW) in which signals propagate as electric waves. The waveguide 10 is provided with an opening window W1 (first opening window) for radiating electric waves to the outside.

The waveguide 20 is provided with an opening window W2 (second opening window) for absorbing electric waves from the outside and configured to propagate electric waves absorbed through the opening window W2. The waveguide 20 is coupled to the waveguide 10 such that the opening window W2 at least partially overlaps the opening window W1 when a coupling part is viewed in a thickness direction.

The opening window W1 and the opening window W2 have slit shapes extending in a direction orthogonal to the traveling direction of electric waves. The lengths of the opening window W1 and the opening window W2 are equal to the width (lateral width “a” in FIG. 5) of the waveguide 10. In the present embodiment, the opening window W1 and the opening window W2 have equal opening widths.

Note that the opening window W1 and the opening window W2 may have different opening widths. For example, the opening window W1 may be formed to be larger than the opening window W2 such that the opening window W2 is contained within the opening window W1.

In the present embodiment, the waveguide 10 and the waveguide 20 are substrate integrated waveguides. Note that a substrate integrated waveguide is also referred to as an embedded substrate waveguide or a post-wall waveguide.

The anisotropic conductive film 30 is an anisotropic conductive film (ACF) containing a plurality of conductive particles CP. The anisotropic conductive film 30 is provided to cover the opening window W1 and the opening window W2 and bonds the waveguide 10 and the waveguide 20. The waveguide 10 and the waveguide 20 (more specifically, conductive layers of the respective waveguides) are electrically connected to each other through the anisotropic conductive film 30. The anisotropic conductive film 30 functions as a bonding agent and bonds the waveguide 10 and the waveguide 20.

As illustrated in FIG. 1, the conductive particles CP of the anisotropic conductive film 30 are included in an overlapping part of the opening window W1 and the opening window W2 when a coupling part of the waveguide 10 and the waveguide 20 is viewed in the thickness direction. Note that the size of the conductive particles CP contained in the anisotropic conductive film 30 is smaller than the widths of the opening windows W1 and W2 in the slit shapes.

Note that, as illustrated in FIG. 1, in the coupled waveguide 1 of the present embodiment, a microstrip line MSL1 connects to the waveguide 10, and a microstrip line MSL2 connects to the waveguide 20. In each of the microstrip lines MSL1 and MSL2, a signal line having a tapered width at an end part is provided on the upper surface of a dielectric layer, and a ground layer (not illustrated) is provided on the lower surface of the dielectric layer. The microstrip line MSL1 and the waveguide 10 may be integrated and include a common dielectric layer. Similarly, the microstrip line MSL2 and the waveguide 20 may be integrated and include a common dielectric layer.

The planar shapes of the waveguides 10 and 20 are not limited to a straight line shape as illustrated in FIG. 1 but may be shapes with curved parts.

A detailed configuration of the waveguide 10 will be described below with reference to FIGS. 3 to 5.

The waveguide 10 includes a dielectric layer 11 (first dielectric layer) having an upper surface (first principal surface) and a lower surface (second principal surface), a conductive layer 12 (first conductive layer) provided on the upper surface of the dielectric layer 11, a conductive layer 13 (second conductive layer) provided on the lower surface of the dielectric layer 11 and including the opening window W1, a plurality of conductive posts 14 constituting a first post column, and a plurality of conductive posts 15 constituting a second post column. The conductive layer 13 is partially removed to form the opening window W1.

The dielectric layer 11 in the present embodiment is made of a flexible material such as a liquid crystal polymer (LCP). The dielectric layer 11 is not limited to a single layer but may be constituted by a plurality of layers.

Note that the material of the dielectric layer 11 is not particularly limited but may be, for example, polyimide (PI), modified polyimide (MPI), polyethylene naphthalate (PEN), polyetheretherketone (PEEK), or fluorine resin (such as PFA or PTFE). The dielectric layer 11 may be made of a non-flexible material such as ceramic.

The conductive layers 12 and 13 are conductive layers made of a copper foil or the like. Part of the conductive layer 13 is removed to form the opening window W1.

Figure 3:
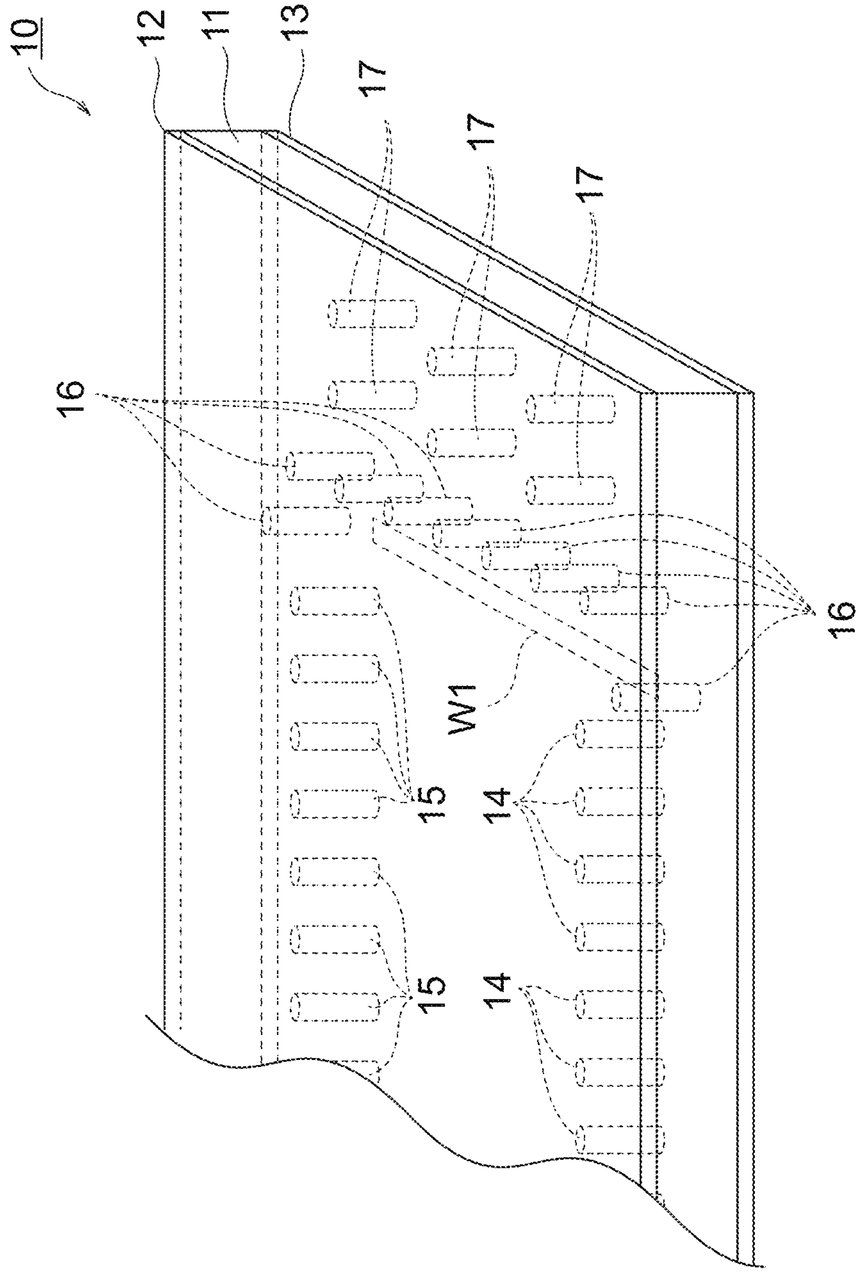
FIG. 3 is a perspective view of a waveguide according to the embodiment.
Figure 4:
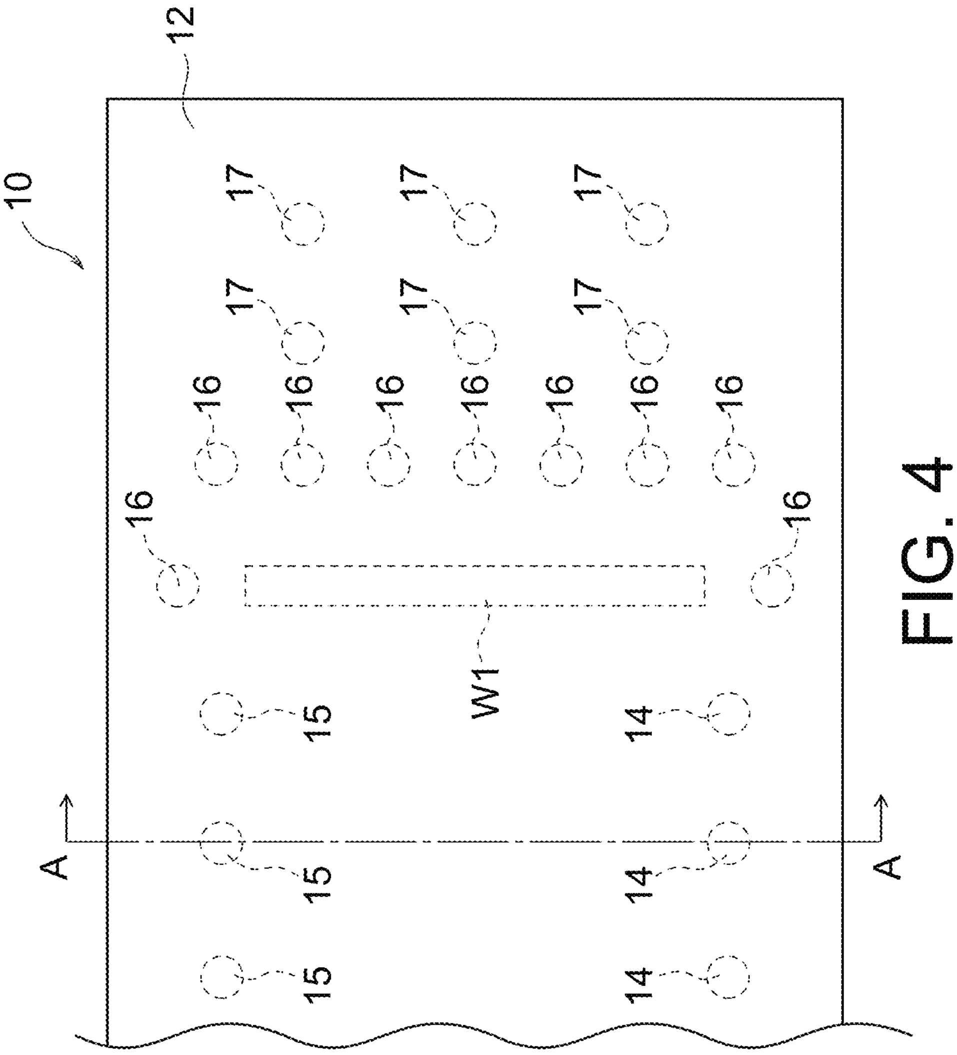
FIG. 4 is a plan view of the waveguide according to the embodiment.

As illustrated in FIGS. 3 and 4, the plurality of conductive posts 14 are arranged in the traveling direction of electric waves (longitudinal direction of the waveguide 10) propagating inside the waveguide 10. Similarly, the plurality of conductive posts 15 are arranged in the traveling direction of electric waves propagating inside the waveguide 10. Electric waves propagating inside the waveguide 10 form an electromagnetic field pattern such as TE10 and travel while reflecting the first post column and the second post column.

In addition to the conductive posts 14 and 15, a plurality of conductive posts 16 are provided to surround the opening window W1. With this configuration, electric waves having propagated inside the waveguide 10 are efficiently radiated to the outside through the opening window W1. In addition, in the present embodiment, a plurality of conductive posts 17 are provided on a back side of the conductive posts 16 (end part side of the waveguide 10). With this configuration, electric waves having propagated inside the waveguide 10 can be prevented from being radiated from the end part of the waveguide 10.

Figure 5:
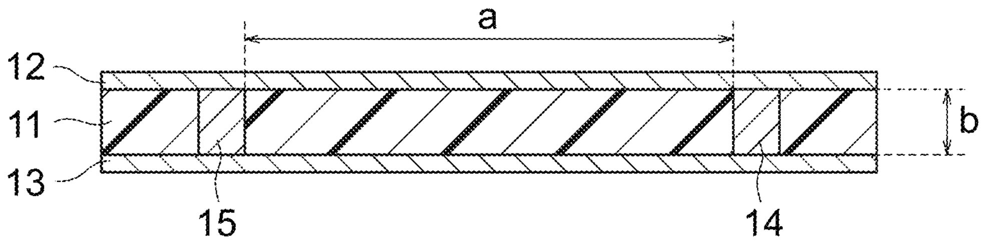
FIG. 5 is a cross sectional view along line A-A in FIG. 4.

As illustrated in FIG. 5, the plurality of conductive posts 14 penetrate through the dielectric layer 11 and electrically connect the conductive layer 12 and the conductive layer 13. Similarly, the plurality of conductive posts 15 penetrate through the dielectric layer 11 and electrically connect the conductive layer 12 and the conductive layer 13. The conductive posts 16 and 17 are configured similarly.

Note that the conductive posts 14, 15, 16, and 17 are not limited to the configuration illustrated in FIG. 5 as long as they are configured as an interlayer connection path electrically connecting the conductive layer 12 and the conductive layer 13. For example, the conductive posts 14 to 17 may be each a via including a land (intermediate land) in the dielectric layer 11, a stack of a plurality of via in the thickness direction of the dielectric layer 11, a stack thereof in a staggered manner with offset stacking positions, or a plating through-hole.

The first post column and the second post column are disposed parallel to each other. A waveguide through which electric waves propagate is formed in the waveguide 10 by the conductive layer 12, the conductive layer 13, the first post column, and the second post column.

As illustrated in FIG. 5, when "a" represents the distance (lateral width of the waveguide) between the conductive posts 14 and the conductive posts 15 and "b" represents the thickness of the dielectric layer 11 (longitudinal width of the waveguide), the waveguide 10 has a cutoff frequency fc provided by an expression below.

$$f_C = \frac{C_0}{2a\sqrt{\varepsilon_r}}\ (\text{Hz}) \qquad \text{[Expression 1]}$$

In the expression, $c_0$ represents the permittivity of vacuum, and $\varepsilon_r$ represents the dielectric relative permittivity of the dielectric layer 11. Note that, although a waveguide forms a plurality of electromagnetic field patterns depending on frequency, the longitudinal width "b" of the waveguide needs to be smaller than the lateral width "a" of the waveguide to transmit signals in a TE10 mode with highest transmission efficiency.

In the present embodiment, the waveguide 10 and the waveguide 20 are substrate integrated waveguides, and the waveguide 20 has the same structure as the waveguide 10.

Figure 6:
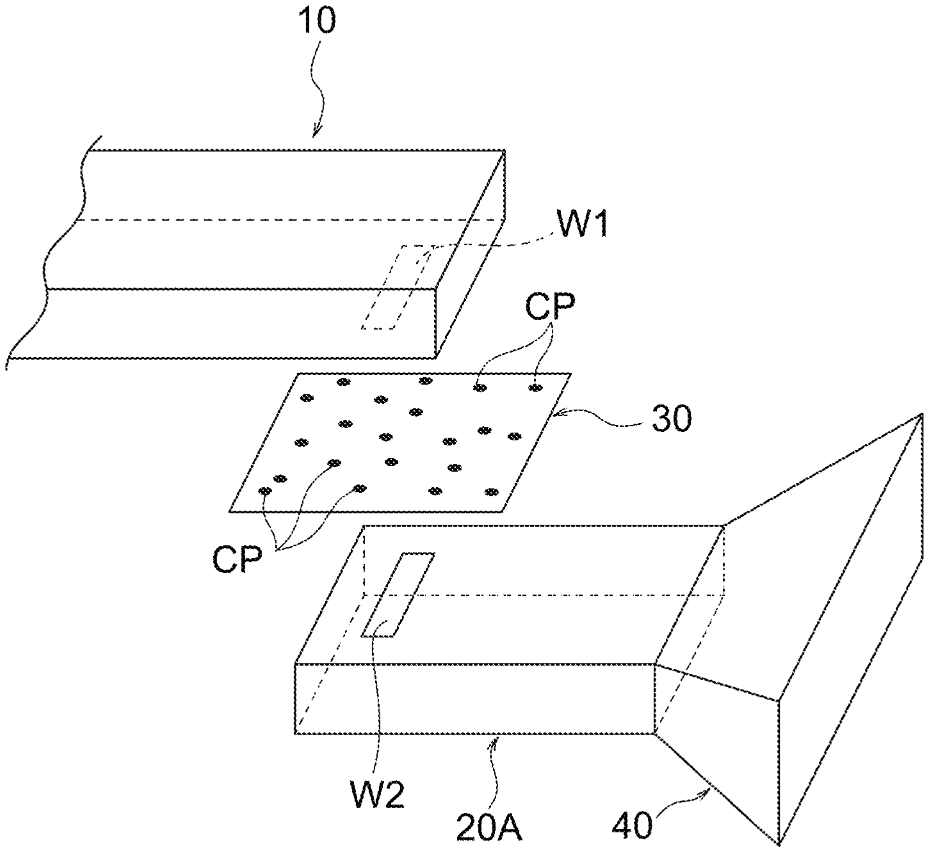
FIG. 6 is an exploded perspective view of a coupled waveguide according to a modification of the embodiment.

Note that the configuration of the waveguides 10 and 20 is not limited to SIW but at least any one of them may be a waveguide pipe made of a prismatic metal pipe. For example, as illustrated in FIG. 6, in place of the waveguide 20, a waveguide 20A configured as a waveguide pipe including the opening window W2 may be coupled to the waveguide 10. A horn antenna 40 may be connected at an end part of the waveguide 20A. Note that the horn antenna 40 may be connected at an end part of an SIW waveguide.

Example

Measurement results of the transmission characteristics of the coupled waveguide 1 according to the above-described embodiment will be described below. In the measurement, two samples (Sample A and Sample B) between which the density of the conductive particles CP contained in the anisotropic conductive film 30 is different were produced and measured. Note that there is no other difference than the density of the conductive particles CP between Sample A and Sample B.

In Samples A and B, the lateral width "a" of a waveguide section was 2.8 mm, and the longitudinal width "b" thereof was 0.225 mm. A liquid crystal polymer with a relative permittivity of 2.9 was used as a dielectric layer. The widths of the opening windows W1 and W2 were 100 μm. In production of the samples, the waveguide 10 and the waveguide 20 were coupled such that the opening window W1 and the opening window W2 were substantially aligned with each other.

Different anisotropic conductive films were used for Sample A and Sample B. The thickness of each anisotropic conductive film was 40 μm. The conductive particle density of Sample A was 70/mm$^2$ approximately, and the conductive particle density of Sample B was 350/mm$^2$ approximately. In this manner, Sample B contains conductive particles at higher density than Sample A. The conductive particle diameter was 30 to 40 μm approximately. Note that ACF for IC cards that can be bonded at low temperature and low pressure was used in production of Samples A and B.

Figure 7:
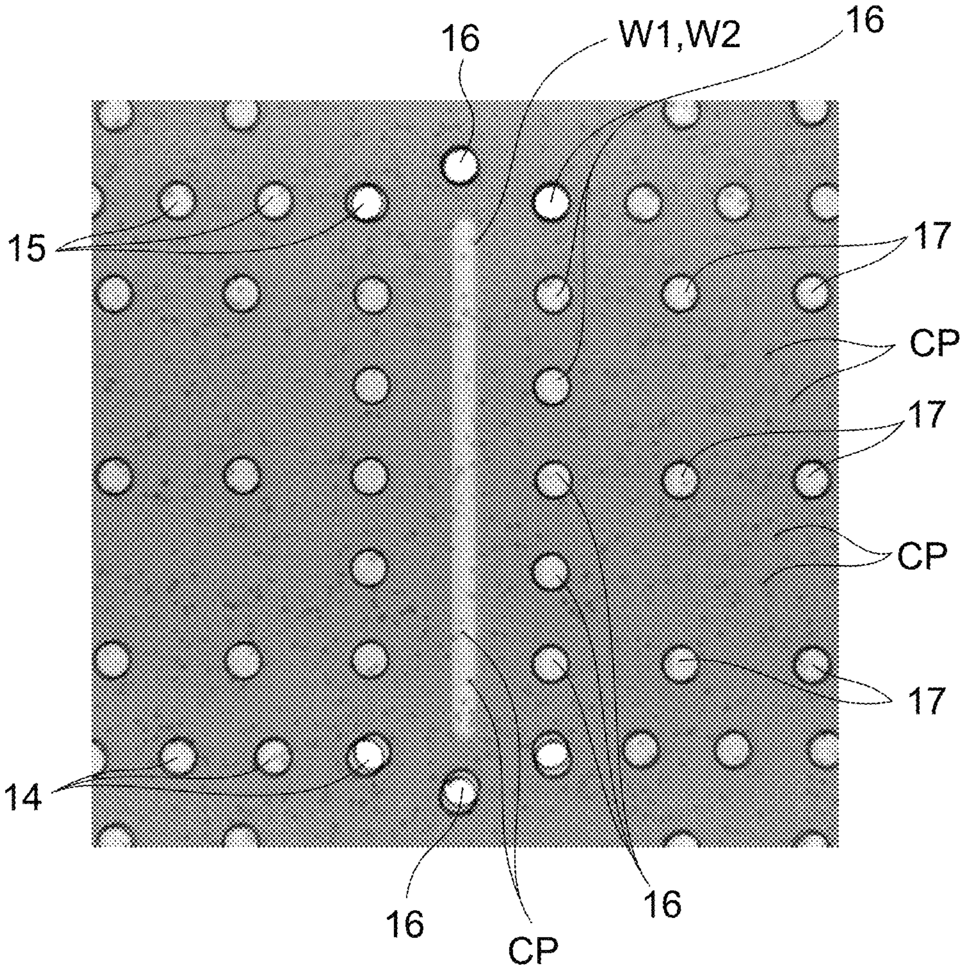
FIG. 7 is an X-ray picture of a coupling part of Sample A.

FIG. 7 is an X-ray picture of the coupling part of produced Sample A when observed from above. In the X-ray picture, the conductive posts 14, 15, 16, and 17, the opening windows W1 and W2, and the conductive particles CP are observed. The conductive particles CP exist in the opening windows W1 and W2. Note that, in FIG. 7, only constituent components of a waveguide on the left side are denoted by reference signs.

The transmission characteristics of the above-described Samples A and B were measured by using an RF probe and a vector network analyzer. Note that the measured transmission characteristics include the transmission characteristics of the microstrip lines MSL1 and 2 in addition to those of the waveguides 10 and 20.

Figure 8:
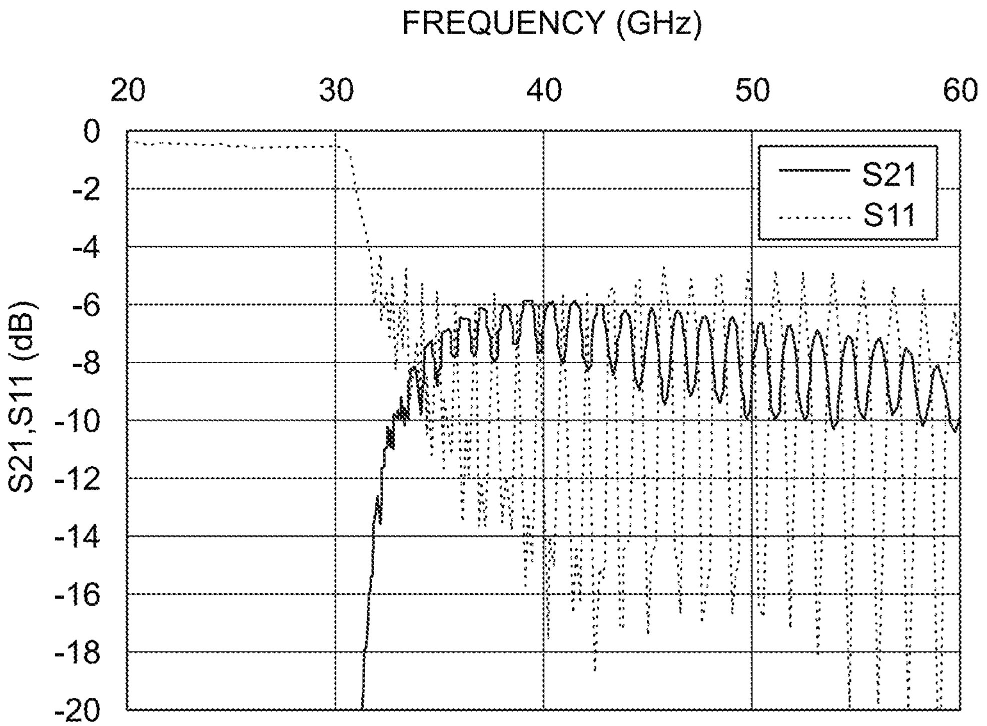
FIG. 8 is a graph illustrating a measurement result of the transmission characteristics of Sample A.

FIG. 8 is a graph illustrating a measurement result of the transmission characteristics of Sample A. In view of the characteristics of parameter S21, the insertion loss decreases (transmission signal increases) at frequencies higher than the cutoff frequency (32 GHz approximately). In view of parameter S11, the reflection component decreases at frequencies higher than the cutoff frequency. In this manner, it was checked that Sample A has desired characteristics as a waveguide.

Figure 9:
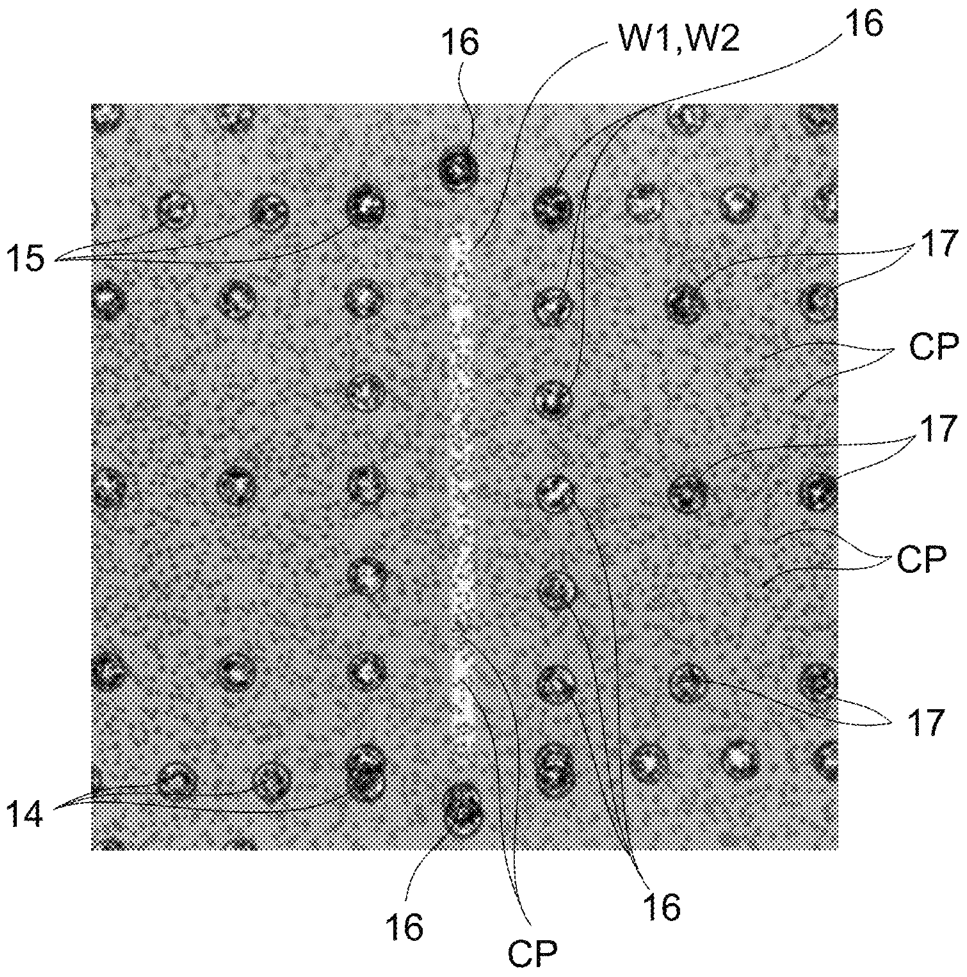
FIG. 9 is an X-ray picture of a coupling part of Sample B.

FIG. 9 is an X-ray picture of the coupling part of produced Sample B when observed from above. In the X-ray picture, the conductive posts 14, 15, 16, and 17, the opening windows W1 and W2, and the conductive particles CP are observed. It can be understood that a large number of conductive particles CP exist in the opening windows W1 and W2 as compared to Sample A. Note that, in FIG. 9, only constituent components of a waveguide on the left side are denoted by reference signs.

Figure 10:
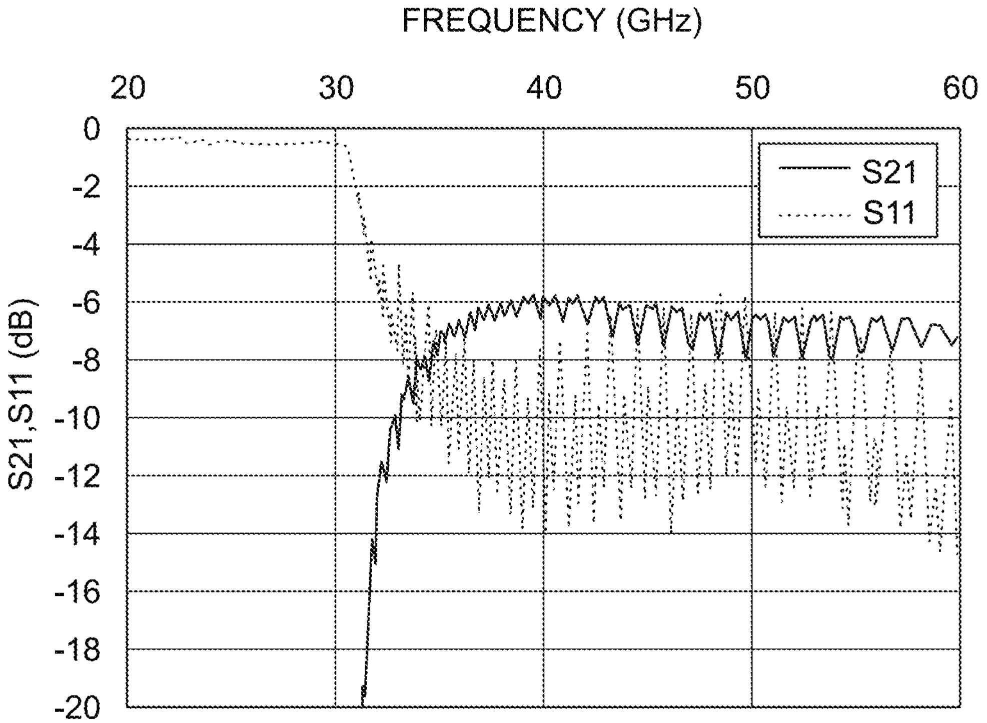
FIG. 10 is a graph illustrating a measurement result of the transmission characteristics of Sample B.

FIG. 10 is a graph illustrating a measurement result of the transmission characteristics of Sample B. As in the case of Sample A, the transmission signal increases and the reflection component decreases at frequencies higher than the cutoff frequency, and it was checked that Sample B has desired characteristics as a waveguide.

In comparison between the measurement results of Sample A and Sample B, waveform pulsing (ripple) decreases at frequencies higher than the cutoff frequency for both S11 and S21 in Sample B. This means that signal reflection at the coupling part is lower in Sample B than in Sample A. This is thought to be because the number of conductive particles CP existing in the opening windows W1 and W2 was larger in Sample B, and accordingly, the opening windows had smaller effective widths, which improved the transmission characteristics.

Figure 11:
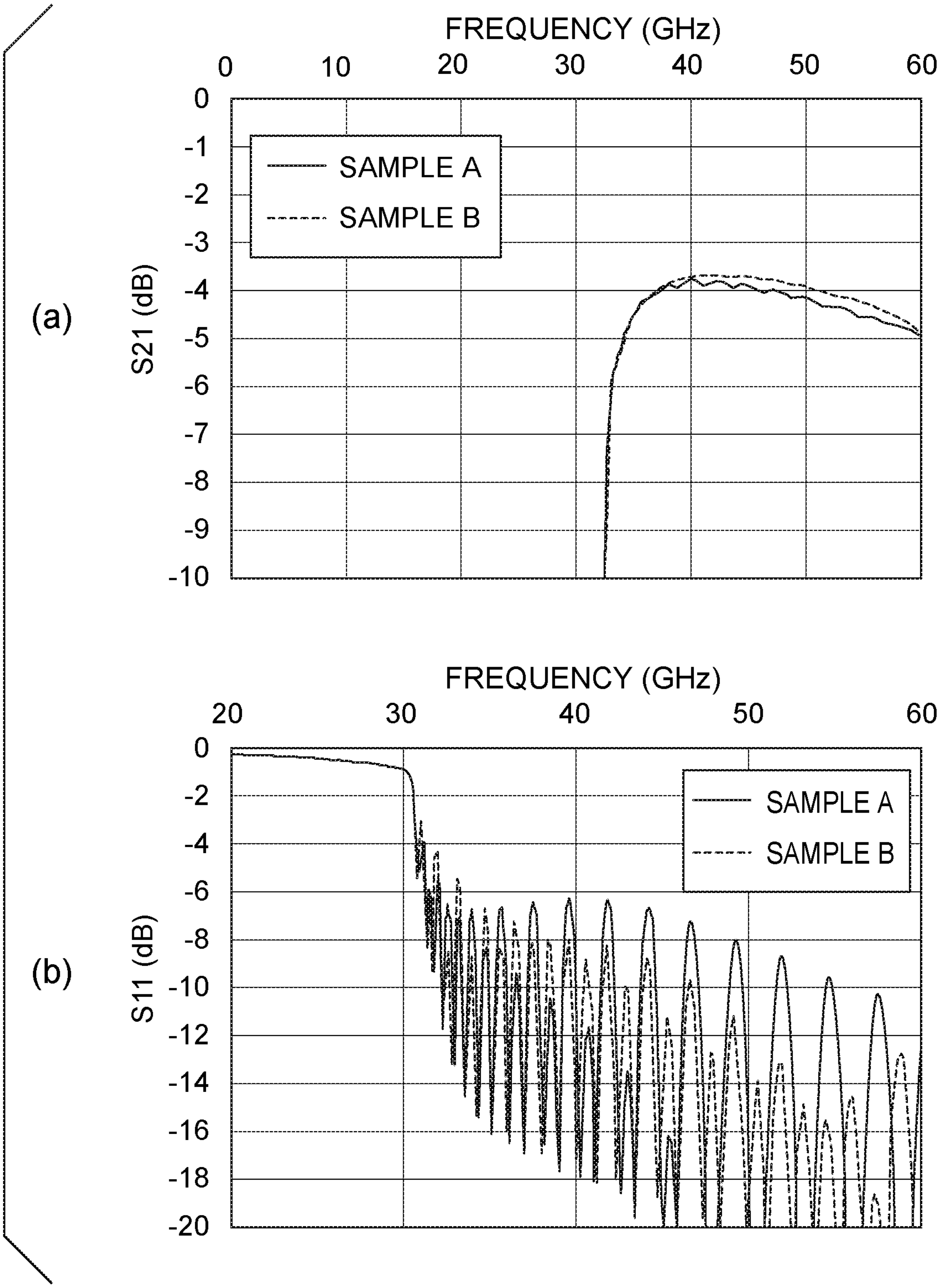
FIG. 11 illustrates graphs illustrating results of simulation using three-dimensional analysis models of Sample A and Sample B.

To verify the above-described consideration, three-dimensional analysis models of Sample A and Sample B were produced and simulation by electromagnetic field analysis was performed. In FIG. 11, (a) and (b) are graphs illustrating simulation results. The frequency characteristics of parameter S21 are indicated by (a) of FIG. 11, and the frequency characteristics of parameter S11 are indicated by (b) of FIG. 11. According to these results, the insertion loss and the reflection loss both are smaller for Sample B, which used an anisotropic conductive film with a higher conductive particle density, than Sample A.

Figure 12:
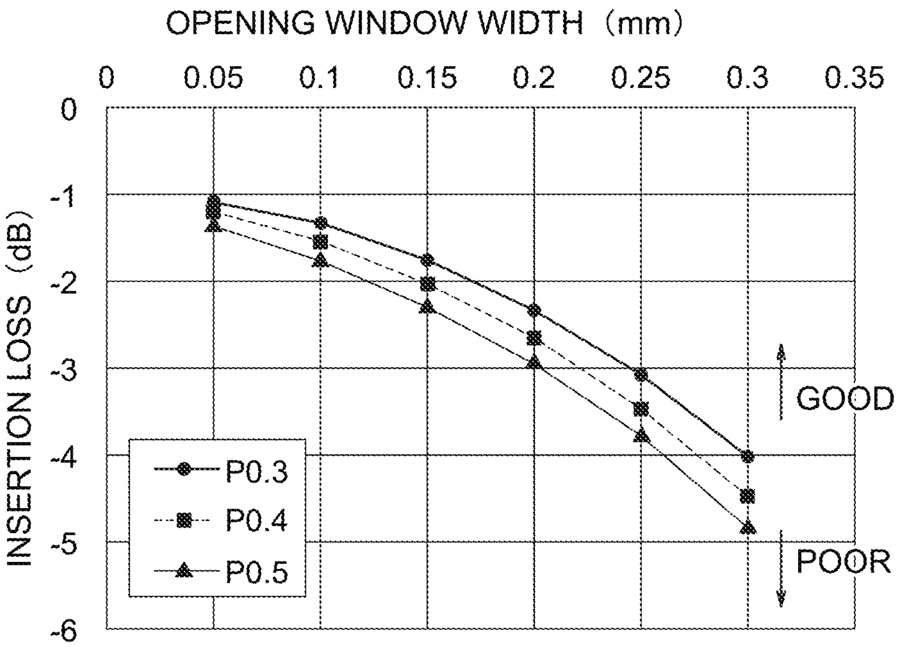
FIG. 12 is a graph illustrating simulation results of the relation between the width of an opening window and the insertion loss by using the position of the opening window as a parameter.
Figure 13:
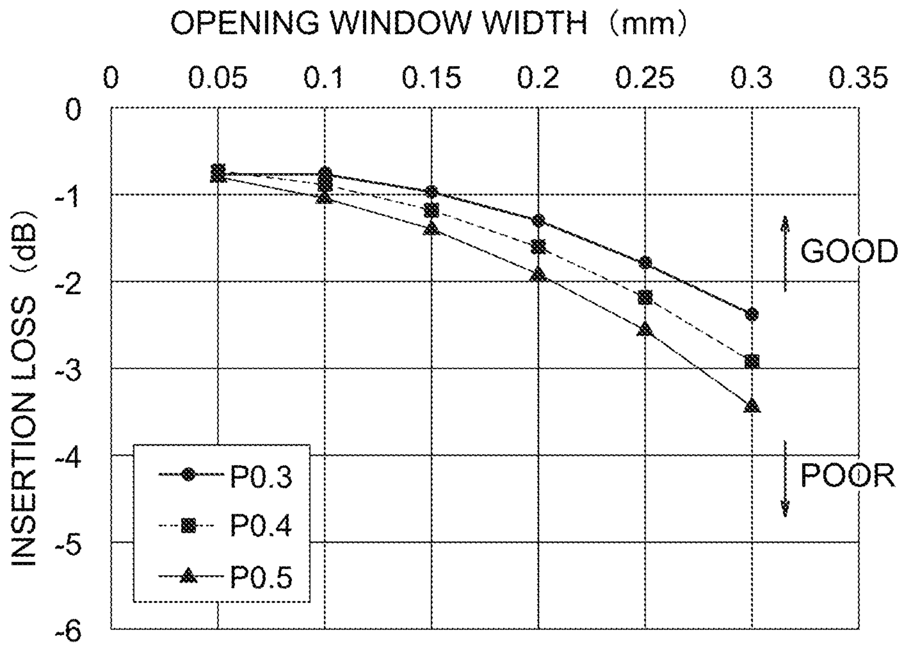
FIG. 13 is a graph illustrating simulation results of the relation between the width of the opening window and the insertion loss by using the position of the opening window as a parameter.

To determine influence of an opening window width on the transmission characteristics, a plurality of coupled waveguide models (however, no anisotropic conductive film is included) were produced to perform simulation by using the opening window width as a parameter, and their results are illustrated in FIGS. 12 and 13. Only the longitudinal width (dielectric layer thickness) of a waveguide section is different between FIGS. 12 and 13. FIG. 12 corresponds to a case where the dielectric layer thickness is 0.2 mm, and FIG. 13 corresponds to a case where the dielectric layer thickness is 0.4 mm.

In FIGS. 12 and 13, the horizontal axis represents the opening window width, and the vertical axis represents the insertion loss at 50 GHz. In the graphs, P0.3, P0.4, and P0.5 indicate positions of an opening window in a waveguide (position from the end part of the waveguide). For example, P0.3 indicates that the opening window is provided at a position separated by 0.3 mm from the end part of the waveguide.

As understood from FIGS. 12 and 13, the insertion loss increases as the opening window width (slot width) increases. Thus, a smaller opening window width is advantageous for improving the transmission characteristics. From this result as well, it is thought that, in Sample B using an anisotropic conductive film with a high density of conductive particles, the effective width of the opening window was smaller than in Sample A using an anisotropic conductive film with a low density of conductive particles, which improved the transmission characteristics.

<Waveguide Coupling Method>

A waveguide coupling method for manufacturing the coupled waveguide 1 described above will be described below.

The waveguide 10 configured to propagate electric waves and provided with the opening window W1 for radiating the electric waves to the outside is prepared. In addition, the waveguide 20 provided with the opening window W2 for absorbing electric waves from the outside and configured to propagate the electric waves is prepared. Note that the waveguide 10 and the waveguide 20 may have the same structure or different structures.

After the waveguides 10 and 20 are prepared, the waveguide 10 and the waveguide 20 are coupled such that the opening window W1 and the second opening window are covered by the anisotropic conductive film 30 and the opening window W1 and the opening window W2 at least partially overlap each other when the coupling part is viewed in the thickness direction. In the present process, for example, the waveguide 10 and the waveguide 20 are stacked with the anisotropic conductive film 30 interposed therebetween such that the opening window W1 and the opening window W2 overlap each other, and then, the stack is heated and pressurized. ACF for IC cards that can be bonded at relatively low temperature and low pressure may be used as the anisotropic conductive film 30.

Note that, based on the above-described sample measurement and simulation results, the density of conductive particles contained in the anisotropic conductive film may be increased to decrease reflection of electric waves at the coupling part of the waveguide 10 and the waveguide 20.

Effects

As described above, in the present embodiment, the waveguide 10 and the waveguide 20 are coupled to each other through the anisotropic conductive film 30 such that the opening window W1 and the opening window W2 at least partially overlap each other. Accordingly, it is possible to easily perform positioning of the waveguide 10 and the waveguide 20 and ensure desired transmission characteristics.

Thus, according to the present embodiment, a coupled waveguide that can be easily manufactured and avoid degradation of the transmission characteristics can be provided.

When an anisotropic conductive film with a high density of conductive particles is used, the effective opening window width decreases, thereby improving the transmission characteristics (insertion loss and reflection loss). The widths of the opening windows W1 and W2 can be made relatively large to further facilitate the positioning.

Although the skilled person in the art could think of additional effects of the present invention and various kinds of modifications based on the above description, the aspect of the present invention is not limited to the individual embodiments described above. Constituent components across different embodiments may be combined as appropriate. Various kinds of addition, change, and partial deletion are possible without departing from the conceptual idea and scope of the present invention derived from contents defined in the claims and their equivalents.

REFERENCE SIGNS LIST

1 coupled waveguide
10, 20 waveguide
11 dielectric layer
12, 13 conductive layer
14, 15, 16, 17 conductive post
30 anisotropic conductive film
40 horn antenna
CP conductive particle
MSL1, MSL2 microstrip line
W1, W2 opening window

What is claimed is:

1. A coupled waveguide comprising:
a first waveguide configured to propagate electric waves and provided with a first opening window that radiates the electric waves to outside;
a second waveguide provided with a second opening window that absorbs electric waves from outside, configured to propagate the electric waves absorbed through the second opening window, and coupled to the first waveguide such that the second opening window at least partially overlaps the first opening window; and
an anisotropic conductive film covering the first opening window and the second opening window and bonding the first waveguide and the second waveguide.

2. The coupled waveguide according to claim 1, wherein conductive particles of the anisotropic conductive film are included in an overlapping part of the first opening window and the second opening window when a coupling part of the first waveguide and the second waveguide is viewed in a thickness direction.

3. The coupled waveguide according to claim 1, wherein the first waveguide includes
a first dielectric layer having a first principal surface and a second principal surface,
a first conductive layer provided on the first principal surface,
a second conductive layer provided on the second principal surface and including the first opening window,
a first post column in which a plurality of conductive posts penetrating through the first dielectric layer and electrically connecting the first conductive layer and the second conductive layer are arranged in a traveling direction of the electric waves, and
a second post column in which a plurality of conductive posts penetrating through the first dielectric layer and electrically connecting the first conductive layer and the second conductive layer are arranged parallel to the first post column.

4. The coupled waveguide according to claim 3, wherein the second waveguide includes
a second dielectric layer having a third principal surface and a fourth principal surface,
a third conductive layer provided on the third principal surface and including the second opening window,
a fourth conductive layer provided on the fourth principal surface,
a third post column in which a plurality of conductive posts penetrating through the second dielectric layer and electrically connecting the third conductive layer and the fourth conductive layer are arranged in a traveling direction of the electric waves, and
a fourth post column in which a plurality of conductive posts penetrating through the second dielectric layer and electrically connecting the third conductive layer and the fourth conductive layer are arranged parallel to the third post column.

5. The coupled waveguide according to claim 4, wherein the first opening window and the second opening window have slit shapes extending in a direction orthogonal to the traveling direction of the electric waves, and the first opening window and the second opening window have equal opening widths.

6. The coupled waveguide according to claim 4, wherein the first opening window and the second opening window have slit shapes extending in a direction orthogonal to the traveling direction of the electric waves, and the first opening window and the second opening window have different opening widths.

7. The coupled waveguide according to claim 3, wherein the second waveguide is a waveguide pipe including the second opening window.

8. The coupled waveguide according to claim 7, comprising a horn antenna connected to an end part of the waveguide pipe.

9. The coupled waveguide according to claim 1, wherein the first opening window and the second opening window have slit shapes extending in a direction orthogonal to a traveling direction of the electric waves, and a size of conductive particles contained in the anisotropic conductive film is smaller than widths of the first and second opening windows in the slit shapes.

10. A waveguide coupling method comprising:
a step of preparing a first waveguide configured to propagate electric waves and provided with a first opening window that radiates the electric waves to outside;
a step of preparing a second waveguide provided with a second opening window that absorbs electric waves from outside and configured to propagate the electric waves absorbed through the second opening window; and
a step of covering the first opening window and the second opening window with an anisotropic conductive film and coupling the first waveguide and the second waveguide such that the first opening window and the second opening window at least partially overlap.

11. The waveguide coupling method according to claim 10, comprising increasing density of conductive particles contained in the anisotropic conductive film to reduce reflection at a coupling part of the first waveguide and the second waveguide.

* * * * *